United States Patent Office 3,557,049
Patented Jan. 19, 1971

3,557,049
REACTIVE MIXTURES OF THERMOPLASTIC VINYL CHLORIDE POLYMERS WITH REACTIVE PLASTICIZERS
Irving E. Muskat, Miami, Fla., assignor to C-J Corporation, a corporation of Delaware
No Drawing. Continuation-in-part of applications Ser. No. 573,858, Aug. 22, 1966, and Ser. No. 656,349, July 27, 1967. This application Sept. 17, 1968, Ser. No. 760,363
Int. Cl. C08f 15/28
U.S. Cl. 260—41
21 Claims

ABSTRACT OF THE DISCLOSURE

Reactive mixtures of pasty consistency are formed by mixing thermoplastic polyvinyl chloride particles with reactive plasticizers such as a mixture of ethylene glycol dimethacrylate and styrene and free-radical generating catalyst. Powdered or fibrous fillers are desirably added, especially if the mixture is initially fluid. These plasticizers are absorbed or adsorbed into the polyvinyl chloride and the proportions of plasticizer and filler is adjusted to provide the desired pasty mixture. This mixture may be converted to an intermediate gel state by heating at a temperature and for a time interval, which does not cause significant polymerization. The gel product is a flexible solid which can be cured at temperatures of 120–200° C. In preferred practice, a mixture of dispersion grade and suspension grade polyvinyl chloride particles are used to form an initially fluid mixture and fibers are mixed in, and if necessary the mixture is allowed to thicken, to form a non-flowable paste which is encased in protective cellophane sheets and rolled to sheet form essentially free from air with the resin and fibers flowing together to maintain uniform distribution. This sheeted material can be gelled to stabilize it for subsequent use.

---

The present invention is a continuation-in-part of my prior applications Ser. Nos. 573,858, filed Aug. 22, 1966, and 656,349, filed July 27, 1967.

The present invention relates to the production of plastic products based on thermoplastic polyvinyl chloride polymers and copolymers and which possess thermoset properties characterized by increased heat distortion temperature and solvent resistance. The invention is particularly directed to the provision of non-porous products which can be stored for long periods and which, nonetheless, are rapidly curable by the mere application of heat and pressure to form cured products of improved properties. The invention especially contemplates pasty mixtures containing powdered and/or fibrous fillers in which the filler and resin components flow together under applied pressure as when the product is rolled or pressed into a sheet or molded in order to form reinforced products in which the reinforcement is uniformly distributed. The mixtures of the invention including the sheeted products noted above can be converted into an intermediate gel condition in which the mixture has the character of a flexible solid which is stable on storage and readily molded and cured under applied heat and pressure.

The handling of vinyl chloride polymers has presented considerable difficulty and the present invention is concerned with minimizing these difficulties as well as upgrading the chemical and physical properties of the products which are produced. The production of structural elements by high speed molding processes is particularly contemplated since the hand lay up procedures and pre-form molding required with polyester and epoxy-type resins have not been satisfactory either from the standpoint of economy or from the standpoint of quality.

In accordance with the invention, particles of a thermoplastic vinyl chloride polymer are combined with liquid plasticizer comprising a low molecular weight polyester reaction product of alpha,beta-ethylenically unsaturated monocarboxylic acid and a monoethylenic monomer from the group of styrene, vinyl toluene, chlorostyrene and similar monovinyl aromatic compounds and mixtures thereof. The materials and proportions are selected to provide a pasty mixture in which any fillers are uniformly dispersed. In addition to any desired reinforcement, free-radical polymerization catalyst as well as whatever stabilizers, modifiers, dyes, colorants and other usual polyvinyl chloride additives which are desired are dissolved or dispersed in the mixture before the paste is processed further. This pasty mixture can be molded directly or it can be extruded or sheeted with or without gelation at a temperature and for a time interval which does not cause significant polymerization, the pasty form of the mixture enabling all of the components of the mixture to flow together under pressure. The pasty mixture can also be converted to an intermediate gel state in which the product is a flexible solid while still subject to forming, drawing, shaping and molding at elevated temperature which converts the gel to a cured product having thermoset characteristics. The gel can be stored and used in sheet form or it can be pellitized or sliced into moldable materials to be fed into mold cavities or used in diverse molding processes.

Conversion to the gel state is achieved by subjecting the mixture to an intermediate solvating temperature for a time sufficient to cause the liquid plasticizers to flux with the vinyl chloride polymer without causing significant polymerization. In this way, a largely non-porous flexible solid is produced in which the capacity for polymerization at temperatures above 120° C. to induce thermosetting characteristics is retained for long periods of time. The intermediate temperatures needed for solvation are generally above 80° C., with temperatures of from 80° C.–120° C. being effective when applied for periods of from about ½ to about 5 minutes. Below 80° C. longer time is needed. At temperatures above 120° C., e.g., temperatures of from 135–150° C., gelation will occur in from 5–15 seconds. It is to be understood that the temperatures referred to are press temperatures and, particularly at the higher temperatures, it does not appear that the mixture actually reaches this temperature. This intermediate non-porous polymerizable flexible solid is termed a gel and it is preferably used in the form of a sheet, or the sheet may be sliced into discrete moldable pieces which facilitates subsequent use. Despite the solid condition of the gel, it flows under heat and pressure and the discrete pieces fuse together to form a unitary non-porous product.

The desired pasty condition is preferably obtained by utilizing mixtures of dispersion grade resin particles and suspension grade resin particles. The term "pasty" is used herein to define a "thixotropic-like" condition which is non-flowable in the absence of applied pressure.

The thermoplastic vinyl chloride polymers which are used should contain at least about 85% by weight of vinyl chloride, more preferably at least 90%, but the balance of the polymer may be constituted by other polymerizable ethylenic monomers such as vinyl acetate, vinylidene chloride and the like. Polyvinyl chloride containing in excess of 96% by weight of vinyl chloride is particularly preferred. Polyvinyl chloride made by any process can be reduced to a desirable particle size and used in this invention, but it is stressed that preferred practice uses suspension grade particles in admixture with dispersion grade particles since this enables fluid systems to be fiber reinforced and then sheeted with a higher percentage of polyvinyl chloride.

While polyvinyl chloride of high molecular weight tends to provide products of outstanding properties, nonetheless, products of lower molecular weight and copolymers containing a small proportion of copolymerizing monomer such as vinyl acetate or vinylidene chloride are at times desirable due to greater ease of handling.

Materials and proportions are selected to provide a pasty mixture which can be handled so that, when it is subjected to pressure, it will flow with all of the intermixed components flowing together to remain in uniform admixture.

Generally speaking, up to about 50 parts of liquid plasticizers can be mixed with 50 parts of polyvinyl chloride resin to obtain an effective fluid or pasty composition and this will occur when dispersion grade resins are mixed with plasticizer mixtures rich in styrene and where reinforcing materials are incorporated. It is generally preferred to use smaller proportions of liquid plasticizer sufficient to obtain a fluid or pasty blend for a long enough time to permit the mixture to be sheeted and gelled if desired.

The preferred mixtures are initially fluid which permits fibers and other reinforcements to be mixed when desired. Usually the final mixture including all the fillers, fibers and additives as well as the polyvinyl chloride and plasticizers becomes pasty and grease-like either immediately after admixture or shortly thereafter when some of the plasticizers are absorbed by the solids in the mixture, and this pasty characteristic markedly improves the sheeting operation. The ability of resin and filler to move in unison not only insures uniformity, but it avoids damaging discrete fibers and it prevents entrapment of air in the mixture.

The invention includes the concept of blending the reinforcing materials with the liquid components of the mixture before the resin particles are added so that mixtures can be prepared at very high vinyl chloride resin content and with good "wetting" of the fillers.

Similarly, and with initially fluid mixtures, the invention contemplates increasing the proportion of vinyl chloride resin and of the reinforcing material if any is used by evaporating away some of the volatile monoethylenic monomer, especially styrene, after the fluid mixture has been worked to uniformly distribute the components of the mixture or to incorporate reinforcing fibers therein.

Removal of volatile monomer when desired is particularly contemplated after the mixture has been converted to the gel state. When the protective cellophane sheets are removed, unpolymerized volatile monomer will evaporate from the flexible solid gel at room temperature. Vaporization can be accelerated using moderate heat and vacuum and, so long as the temperature is not excessive or maintained for too long a time, the gel will not cure. When the desired proportion of styrene has been removed, the gel product or discrete pieces thereof are maintained in a closed container to minimize further loss of monomer therefrom. The vaporized monomer can be recovered in conventional fashion if desired.

Generally, the ratio of plasticizer to vinyl chloride resin should be at least about 30/70 to provide an initially fluid mixture, but this minimum will vary with the proportion of suspension grade resin. Preferably, a ratio of at least 35/65 is used with at least 25% of the resin being of suspension grade to insure adequate fluidity and working time to incorporate large proportions of solid materials, preferably at least 5%, based on total weight of reinforcing fibers. Most preferably, from 40-65% of the resin is suspension grade resin with the balance being dispersion grade resin since these mixtures thicken to provide a highly tacky mixture in which the resin and solids incorporated therein flow together as the mixture is sheeted out with rolling pressure.

The sheeting referred to is usually carried out by rolling the tacky mixture between sheets of cellophane, thus removing entrapped air. Nitrocellulose coated cellophane is helpful to minimize adhesion between the confining sheet and the resin and permits easy heat sealing of the cellophane sheets. Of course, other films and metal foils which are inert to the various components of the mixture can also be used.

When the proportion of dispersion grade resin is excessive, the proportion of plasticizer needed for initial fluidity and adequate working time is excessive. Conversely, with too much suspension resin, adequate tack is not achieved.

It is stressed that the prior art used liquid mixtures of resin and plasticizer and this required dispersion grade resins and excessive proportions of plasticizer to provide a stable plastisol which was then used to reinforce fabrics of various type by impregnation. The thrust of the present invention is completely opposite to these standard techniques.

It is also pointed out that prior efforts to incorporate discrete fibers have involved milling of the resin-fiber mixture which disrupts and fractures the fiber component of the mixture.

The liquid plasticizer in this invention is a mixture of monoethylenic and polyethylenic monomers, both being essential to obtain an inexpensive system which will be adequately fluid for fiber reinforcement, and adequately reactive and compatible to permit the development of adequate cure.

While styrene, vinyl toluene, chlorostyrene and similar monovinyl aromatic compounds and mixtures thereof are all useful to provide the bulk of the monoethylenic plasticizer since all are adequately fluid, reactive, absorptive in polyvinyl chloride and compatible in polymeric form both with the polyvinyl chloride and with polyethylenic monomers, styrene and vinyl toluene are preferred. The cost advantage of these monomers is combined in the invention with the fluidity and further economy achieved by the selection of suspension grade polyvinyl chloride and also with economy in production. The chlorostyrenes generally give longer pot-life, and when necessary, this characteristic justifies their use.

Vinyl toluene is particularly appropriate and the presence of a proportion of this monomer is advantageous in providing an increase in mixing time and, despite its low cost, it possesses low volatility, low heat of polymerization and better shrinkage properties, all of which lead to superior product properties. Thus, a proportion of vinyl toluene may be desirably included when styrene is the monomer and vinyl toluene is especially valuable for the production of superior low cost products having the properties noted hereinbefore. Indeed, the use of styrene in admixture with a less volatile monovinyl aromatic monomer such as vinyl toluene or chlorostyrene is particularly appropriate to permit higher proportions of solid material (polyvinyl chloride or powdered or fibrous filler) to be used. The lower cost styrene which is more volatile will evaporate preferentially from the gel product containing the same, and the more expensive and superior monomer remains behind to participate in the final cure.

From the standpoint of overall properties including reactivity, cross-linking capacity for monovinyl aromatic compounds, and compatibility with monovinyl aromatic compound and polyvinyl chloride in both monomeric and polymeric form, the invention employs as the polyethylenic plasticizer a low molecular weight polyester reaction product of alpha, beta-unsaturated monocarboxylic acid such as acrylic acid, chloroacrylic acid, bromoacrylic acid, alkoxy acrylic acid (methoxy or butoxy), alkyl, aryl or acyl acrylic acid (methacrylic acid, phenylacrylic acid, and crotonic acid) with an aliphatic polyhydric alcohol such as ethylene glycol, propylene glycol, n-butylene glycol, isobutylene glycol, 1,3-butylene glycol, 1,5-pentane diol, diethylene glycol, dipropylene glycol, trimethylol propane, glycerin, pentaerythritol, etc., the polyhydric alcohol having a molecular weight below 600, preferably below about 200, to provide a low molecular weight polyester having a plurality of highly reactive ethylenic groups per molecule and which, while incapable of dissolving the polyvinyl chloride at temperatures of about room temperature is, nonetheless, capable of solvating the polyvinyl chloride polymer at elevated temperatures.

Typical reactive plasticizers in accordance with the invention are exemplified by ethylene glycol dimethacrylate, propylene glycol dimethacrylate, diethylene glycol dimethacrylate, 1,3-butylene glycol dimethacrylate, 1,5-pentane diol dimethacrylate and trimethylol propane trimethacrylate. Similarly, the acrylate and chloroacrylate and other a-substituted acrylic acid esters may be used.

Less preferably, unsaturated alcohol esters of unsaturated carboxylic acids such as allyl acrylate or methacrylate or methallyl acrylate or methacrylate may also be used.

The reactive plasticizer is preferably a liquid at room temperature or gives a liquid solution when mixed with the monoethylenic plasticizer component so that fluid mixtures can be easily handled. 1,3-butylene glycol dimethacrylate is especially preferred and will be used to illustrate the invention.

From the standpoint of proportions, the monoethylenic plasticizer may constitute from 20% to 98% of the liquid plasticizer component but preferably the proportion of monoethylenic plasticizer is from 40–95% by weight. On the other hand, at least a portion of the mixture of plasticizers must be polyethylenic if a significant thermosetting cure is to be achieved.

It should be understood that certain features of this invention have significance even when the solvent resistance conferred by the polyethylenic plasticizer is not regarded as important, and in such instance, this component can be omitted. On the other hand, it is possible to omit the monoethylenic plasticizer, though, as a practical matter, increase in the proportion of polyethylenic plasticizer above 50% based on total unsaturated plasticizer provides limited further improvement in solvent resistance.

Fiber reinforcement is a feature of the invention, for it is fiber reinforcement which underscores the physical properties of the product which are exceptional even in the absence of fiber reinforcement. Indeed, and especially when a mineral fiber such as glass fiber is used, the achievement of uniform distribution of a sizable proportion of fiber can greatly enhance properties which are not normally regarded as physical, e.g., the heat resistance of the product can be significantly improved by the mere fact of appropriate fiber reinforcement. Glass fiber is generally available as strands made up of many fibers—usually 50–250 or more fibers in each strand. These strands of glass fibers are coated, and it is important (for best reinforcing properties) that the coating is one which permits defibrillation of the strand and good "wetting" of the fibers with the resin component.

At least 5% by weight of fiber based on plasticized resin should be present in order to significantly upgrade the properties of the resin component. On the other hand, larger proportions of fiber are desirably worked into the fluid mixtures which are formulated, preferably at least 10% by weight. Even larger proportions of fiber can be worked in, e.g., up to about 50%, but more usually from 10–30%. As will be appreciated, the proportion which can be worked into the liquid mixture will depend upon the initial fluidity of the mixture, the rate at which the mixture thickens, the fineness of the fiber, and its length.

Fibers up to about 1" in length are well tolerated and fibers having a length of ⅛" to ½" are particularly desirable. On the other hand, longer fibers may be used though these will likely be broken up to some extent because of working and/or comminution of the gelled mixture into discrete pieces. Also, the fiber can be broken up to powder form (milled fibers) before incorporation but it will still retain its fibrous character so that it will function in a manner superior to ordinary particulate pigments and fillers which are also useful in the invention, although such powder-sized fibers will not entirely substitute for fibers of ⅛" and longer which are far more easily used in this invention than heretofore.

It will be appreciated that dyes, lubricants, stabilizers, inhibitors and small proportions of standard polyvinyl chloride plasticizers if desired and other conventional additives may also be used as is generally known in the industry.

While special techniques are needed for efficient incorporation of reinforcing material and especially fiber reinforcement, any mixing technique such as milling or extrusion can be used when disruption of the fibers as a result of the shearing forces encountered is not of significance or where reinforcing fibers are not present. The mixtures of the invention are desirably sheeted and then gelled and this intermediate product having the form of a flexible solid gel is then used as such or may be desirably sliced into discrete pieces to facilitate handling and use. These discrete pieces will normally possess dimensions in the range of ⅛" to 1". It is a feature of the invention that these discrete pieces of gelled material will flow together under pressure at a temperature in excess of about 120° C. and polymerization can then take place to provide an integral and unitary cured mass. Moreover, if the pieces contain reinforcing fibers, these fibers will flow with the resin component of the piece so that the final cured product can be reinforced as desired. The pieces of gelled material are desirably stored in closed containers to maintain the proportion of volatile monomer therein constant.

The final cure requires temperatures above about 120° C. at which polymerization of the plasticizers takes place and a thermosetting cure ensues rapidly, normally completed in from 1 to 6 minutes. Temperatures up to about 200° C. can be practicably used for the cure. If polyfunctional plasticizer is used alone, or with chlorostyrene as the monofunctional monomer, cure can occur at a lower temperature and can be effected in shorter time.

It is not feasible to catalyze the mixtures of the invention after gelation and the catalyst is preferably added to one or more of the liquid components before the solid components of the mixture are added. It has been found that ordinary free-radical polymerization catalysts can be used and that these will retain their activity despite elevated temperature gelling and subsequent prolonged storage. Moreover, the flexible solid gels which are formed as taught herein will respond to appropriate curing temperatures with extensive flow of resin and fiber as well as extensive cure.

The catalysts which are used in the invention are free-radical polymerization catalysts, usually of the peroxy type. Numerous catalysts of this type are well-known, specific catalyst selection in accordance with the invention being of secondary significance. These catalysts retain activity for long periods in the solid flexible mass which is formed. Catalyst selection is primarily determined by the temperature at which the catalyst liberates free-radicals in sufficient quantity in a reasonable time. Thus, any catalyst known to be useful for curing the plasticizer per se can be used to cure the combinations which are formulated because effective solvation of these mixtures can occur below the temperatures which will cause extensive curing. Generally, the preferred catalysts liberate free-radicals in the range of from 120–200° C. On this basis, t-butyl perbenzoate is preferred to benzoyl peroxide when higher temperature cure is desired for the blends of polyvinyl chloride used herein. Azodiisobutyronitrile and like catalysts are also quite useful.

It is desired to point out that the concept of utilizing mixtures of suspension grade and dispersion grade polyvinyl chloride particles together with sufficient reactive plasticizer comprising styrene, vinyl toluene or chlorostyrene to provide an initially fluid mixture into which separate fibers can be mixed to provide a tacky paste which can be sheeted using rolling pressure to form the paste into a thin sheet without disrupting the incorporated fibers is of importance in maximizing the proportion of vinyl chloride polymer which can be used with reinforcing fibers. This technique is therefore of value regardless of whether the reactive plasticizers include other vinyl monomers or polyethylenic monomers. Thus, and where solvent resistance is of secondary importance, this technique is of value even in the absence of a thermosetting cure resulting from the presence of polyfunctional plasticizer.

The proportion of vinyl chloride polymer can be further increased when it is recognized that the monoethylenic monomer, and especially styrene, is volatile so that if the sheets used to confine the tacky fiber-filled mass are removed, a proportion of the monoethylenic monomer will evaporate, thus increasing the relative proportion of vinyl chloride polymer to reactive plasticizer and also increasing the percentage of fiber reinforcement.

EXAMPLE 60 parts by weight of polyvinyl chloride resin constituted by an equi-weight mixture of dispersion grade and suspension grade products each of which are high molecular weight essentially homopolymeric polyvinyl chloride resins are mixed with 40 parts by weight of liquid plasticizer constituted by a 5/35 weight ratio mixture of 1,3-butylene glycol dimethacrylate and styrene. The dispersion grade resin has an average particle size which permits 100% passage through a 200 mesh screen and the suspension grade resin has an average particle size which permits 95% to pass through a 100 mesh screen.

The mixture is of low viscosity as initially formulated and pourable at room temperature. 1% by weight of t-butyl perbenzoate, based on the weight of plasticizers, is mixed into the plasticizers before the resin particles are added. The mixture has a work life of many hours (at least 4 hours).

Glass fibers in the form of chopped glass roving ½" in length are added to constitute 28% by weight of the total mixture, 20–35% representing normal preferred practice.

At this stage, the fiber-containing mixture may be fluid or pastry. If the mixture is too fluid, the application of pressure will cause the fibers to separate from the resin and the mixture is allowed to stand until it thickens and becomes pasty as indicated by the development of a sticky mass which does not flow in the absence of applied pressure. This pasty mixture is placed between nitrocellulose-coated cellophane sheets and rolled to form a sheet having a thickness of ⅛". Of course, the thickness of the sheet can be varied as desired. This sheet is confined between press platens having a temperature of 140° C. for 10 seconds to cause the polymer particles to fuse together and form a non-porous flexible sheet which can be cured using temperatures of 120–200° C. for from 1 to 6 minutes, with longer cures permitted.

Typical molding conditions are 150° C. at pressures of from 10–1000 p.s.i., the cure being easily completed in two minutes. The flexible gelled sheet can be cut up into small squares, e.g., ⅛"–½" on a side and molded under the conditions specified with the resin and fiber flowing together to fill the mold and form a unitary product.

Repeating the foregoing, but removing the protective cellophane sheet allows much of the styrene to evaporate and the polyvinyl chloride content is increased in the final cured product. By noting the loss in weight of the gelled sheet, the loss of styrene can be readily controlled to give a specific formulation. In this example, the polyvinyl chloride content of the mixture based on the combined weight of the resin and plasticizer was increased from 60% to 75%. Of course, the reduced proportion of plasticizer also results in an increase in the proportion of glass fiber based on the total weight of the mixture.

Johns Manville glass roving CS308 illustrates a commercially available glass roving which can be used if desired.

I claim:

1. A pasty mixture in which fillers are uniformly dispersed and consisting essentially of particles of thermoplastic polyvinyl chloride polymer dispersed in a liquid reactive plasticizer component, said polymer containing at least 96% by weight of vinyl chloride and said plasticizer component consisting essentially of low molecular weight polyester reaction product of alpha, beta-ethylenically unsaturated monocarboxylic acid with aliphatic polyhydric alcohol having a molecular weight below 600 or unsaturated alcohol esters of monoethylenic carboxylic acid in admixture with monoethylenic monomer comprising monovinyl aromatic monomer, said monoethylenic monomer constituting from 20% to 98% of said reactive plasticizer component, and free-radical generating polymerization catalyst distributed in said mixture.

2. A pasty mixture as recited in claim 1 in which said monovinyl aromatic monomer is selected from the group consisting of styrene, vinyl toluene, chlorostyrene and mixtures thereof.

3. A pasty mixture as recited in claim 1 having discrete reinforcing fibers dispersed therein.

4. A pasty mixture as recited in claim 1 in which said polymer particles are constituted by a mixture of dispersion grade polyvinyl chloride particles with at least 25%, based on the weight of the mixture of particles, of suspension grade polyvinyl chloride particles.

5. A pasty mixture as recited in claim 4 in which said reactive plasticizer component comprises said polyester reaction product in admixture with monoethylenic monomer comprising styrene with said monoethylenic monomer constituting at least about 50% of said reactive plasticizer component.

6. A pasty mixture as recited in claim 1 in which the weight ratio of liquid plasticizer component to said polyvinyl chloride polymer is from about 30/70 up to about 50/50.

7. A pasty mixture as recited in claim 1 in which said pasty mixture contains at least 5%, based on total weight, of reinforcing fiber.

8. A pasty mixture as recited in claim 5 in which said monoethylenic monomer further comprises vinyl toluene or chlorostyrene.

9. A pasty mixture as recited in claim 1 in which the weight ratio of liquid plasticizer component to said polyvinyl chloride polymer is at least 35/65 and said polymer particles are constituted by a mixture of dispersion grade polyvinyl chloride particles with from 40–60%, based on the weight of the mixture of particles, of suspension grade polyvinyl particles.

10. A pasty mixture as recited in claim 9 in which said pasty mixture contains at least 10% by weight, based on total weight, of reinforcing fibers having a fiber length of from ⅛" to 1".

11. A reactive curable composition comprising the pasty mixture of claim 1 in the form of a flexible solid wherein the polyvinyl chloride particles are solvated and merged with one another without significant polymerization.

12. A flexible solid as recited in claim 11 having the form of a sheet.

13. A flexible solid as recited in claim 12 in which discrete reinforcing fibers are dispersed throughout said sheet with a uniform fiber to resin distribution.

14. A flexible solid as recited in claim 12 in which said sheet is subdivided to form discrete pieces having dimensions in the range of ⅛" to 1".

15. A method of producing a composition adapted to be molded under heat and pressure to produce non-porous molded products comprising forming a mixture comprising vinyl chloride polymer particles containing at least 96% by weight of vinyl chloride dispersed in liquid reactive plasticizer comprising styrene, heating said mixture free from exposure to air at an intermediate solvating temperature for a time sufficient to cause said vinyl chloride particles to flow and merge with one another without effecting significant polymerization to thereby form a flexible solid containing unpolymerized styrene, and allowing said unpolymerized styrene to vaporize from said flexible solid and thereby increase the proportion of said vinyl chloride polymer in the mixture.

16. A method as recited in claim 15 in which said liquid reactive plasticizer comprises a mixture of styrene and less volatile monovinyl aromatic monomer selected from vinyl toluene, chlorostyrene and mixtures thereof.

17. A method of producing a reinforced composition adapted to be molded under heat and pressure with the composition flowing to produce non-porous and cured molded products in which the reinforcement is uniformly distributed comprising forming a reinforced mixture comprising (1) a mixture of vinyl chloride polymer particles of dispersion grade and vinyl chloride polymer particles of suspension grade, said vinyl chloride polymers containing at least 96% by weight of vinyl chloride, at least 25% of said vinyl chloride polymer particles being of suspension grade, (2) liquid reactive plasticizer comprising monovinyl aromatic monomer selected from styrene, vinyl toluene, chlorostyrene and mixtures thereof, (3) free radical polymerization catalyst, and (4) filler, said components (1) and (2) being proportioned to form a fluid mixture upon admixture with one another, and said filler being uniformly dispersed in said mixture, permitting said mixture to stand to cause said monovinyl monomer to be absorbed or adsorbed into said vinyl chloride particles to convert said mixture into a pasty mixture in which said filler will flow with the resinous component of the mixture when the same is subjected to pressure, and then applying pressure to said pasty mixture to form the same into a mass adapted for molding.

18. A method of producing a fiber-reinforced composition adapted to be molded under heat and pressure with with the composition flowing to produce non-porous and cured molded products in which the fiber reinforcement is uniformly distributed comprising forming a fiber-reinforced mixture comprising (1) a mixture of vinyl chloride polymer particles of dispersion grade and vinyl chloride polymer particles of suspension grade, said vinyl chloride polymers containing at least 96% by weight of vinyl chloride, (2) liquid reactive plasticizer comprising monovinyl aromatic monomer selected from styrene, vinyl toluene, chlorostyrene and mixtures thereof, (3) free radical polymerization catalyst, and (4) discrete reinforcing fibers, said components (1) and (2) being proportioned to form a fluid mixture upon admixture with one another, and said discrete fibers being uniformly dispersed in said mixture, permitting said mixture to stand to cause said monovinyl monomer to be absorbed or adsorbed into said vinyl chloride particles to convert said mixture into a pasty mixture in which said discrete reinforcing fibers will flow with the resinous component of the mixture when the same is subjected to pressure, and then applying pressure to said pasty mixture to form the same into a mass adapted for molding.

19. A method as recited in claim 18 in which said pasty mixture is formed into a sheet between protective layers of non-adhesive sheet material.

20. A method as recited in claim 19 in which at least a portion of said monovinyl aromatic monomer is styrene and said protective layers of non-adhesive sheet material are removed to permit a portion of said styrene to evaporate and thereby increase the proportion of vinyl chloride polymer in the mixture.

21. A method of producing a fiber-reinforced composition adapted to be molded under heat and pressure to produce non-porous molded products comprising forming a fluid mixture comprising as the essential resinous component thereof (1) a mixture of vinyl chloride polymer particles of dispersion grade and vinyl chloride polymer particles of suspension grade, said vinyl chloride polymers containing at least 96% by weight of vinyl chloride with said suspension grade particles constituting from 40-60% by weight of the mixture with said dispersion grade particles, (2) liquid reactive plasticizer comprising monovinyl aromatic monomer selected from styrene, vinyl toluene, chlorostyrene and mixtures thereof, and (3) free radical polymerization catalyst, mixing into said fluid mixture materials comprising reinforcing fibers to form a fluid mixture having reinforcing fibers dispersed therein, and then permitting said fluid mixture to stand to cause said monovinyl monomer to be absorbed or adsorbed into said vinyl chloride particles to produce a pasty mixture in which said reinforcing fibers will flow with the resinous component of the mixture when the mixture is subjected to pressure.

References Cited
UNITED STATES PATENTS

| | | | |
|---|---|---|---|
| 2,794,753 | 6/1957 | Duddy | 260—884 |
| 3,133,825 | 5/1964 | Rubens | 260—884 |
| 3,157,713 | 11/1964 | Leese | 260—884 |
| 3,252,935 | 5/1966 | Thompson et al. | 260—884 |
| 3,275,713 | 9/1966 | Rubens et al. | 260—884 |
| 3,275,714 | 9/1966 | Thompson | 260—884 |

FOREIGN PATENTS

| | | | |
|---|---|---|---|
| 293,437 | 1/1964 | Netherlands | 260—884 |

SAMUEL H. BLECH, Primary Examiner

R. J. SEIBERT, Assistant Examiner

U.S. Cl. X.R.

260—884, 899